US012572946B2

(12) United States Patent
Maughan et al.

(10) Patent No.: US 12,572,946 B2
(45) Date of Patent: Mar. 10, 2026

(54) SYSTEMS AND METHODS FOR PRIORITIZING RULES FOR AN EXPERT SYSTEM

(71) Applicant: Mastercard International Incorporated, Purchase, NY (US)

(72) Inventors: Cody Maughan, Bountiful, UT (US); Brijesh Garabadu, Sandy, UT (US); Chandra Tupelly, Newark, CA (US); Debapriya Banerjee, Duvall, WA (US); Saurabh Singh, South Jordan, UT (US)

(73) Assignee: Mastercard International Incorporated, Purchase, NY (US)

( * ) Notice: Subject to any disclaimer, the term of this patent is extended or adjusted under 35 U.S.C. 154(b) by 30 days.

(21) Appl. No.: 18/427,201

(22) Filed: Jan. 30, 2024

(65) Prior Publication Data

US 2024/0257139 A1 Aug. 1, 2024

(30) Foreign Application Priority Data

Jan. 31, 2023 (IN) ............................. 202311006291

(51) Int. Cl.
| | |
|---|---|
| *G06Q 20/40* | (2012.01) |
| *G06F 16/23* | (2019.01) |
| *G06Q 20/38* | (2012.01) |

(52) U.S. Cl.
CPC ....... *G06Q 20/405* (2013.01); *G06F 16/2365* (2019.01); *G06F 16/2379* (2019.01); *G06Q 20/389* (2013.01)

(58) Field of Classification Search
CPC ... G06Q 20/405; G06F 16/2379; G06N 20/00
See application file for complete search history.

(56) References Cited

U.S. PATENT DOCUMENTS

| | | | | |
|---|---|---|---|---|
| 8,401,986 B1 * | 3/2013 | Franke | ................... | G06N 5/025 |
| | | | | 706/47 |
| 10,896,671 B1 * | 1/2021 | Mohajer | ............... | G10L 15/222 |

(Continued)

FOREIGN PATENT DOCUMENTS

| | | | | |
|---|---|---|---|---|
| EP | 4242876 A1 * | 9/2023 | ............. | G06F 40/30 |
| KR | 20200049491 | 5/2020 | | |

(Continued)

OTHER PUBLICATIONS

F. Bodon et al., "Trie: An Alternative Data Structure for Data Mining Algorithms", Mathematical and Computer Modeling 38, 2003, pp. 739-751. Available at: https://doi.org/10.1016/0895-7177(03)90058-6 (Year: 2003).*

(Continued)

*Primary Examiner* — Gregory Harper
(74) *Attorney, Agent, or Firm* — Hovey Williams LLP

(57) ABSTRACT

A computing system receives rules and transaction data from a database. The system creates a potential rule list and stores the rules in the list on the database. The system creates an ordered rule list, a rule-to-transaction lookup table, and a transaction-to-rule lookup table. The system applies each rule to each transaction and identifies each transaction for which each rule is true. The system adds each rule and the identified transactions to the lookup tables and generates a priority-ordered list of the rules iteratively until all rules have been removed from the potential rule list. In each iteration, the system calculates an accuracy of each rule based on all transactions for which the rule is true, appends the highest accuracy rules to the ordered rule list, removes the rules from the potential rule list, and removes the transactions from all entries in the rule-to-transaction lookup table.

20 Claims, 7 Drawing Sheets

(56) References Cited

U.S. PATENT DOCUMENTS

| | | | |
|---|---|---|---|
| 11,256,557 B1* | 2/2022 | Amin | G06F 9/547 |
| 11,288,674 B2* | 3/2022 | Qu | G06Q 20/4016 |
| 11,841,908 B1* | 12/2023 | Robichaud | G06F 16/2477 |
| 11,989,234 B1* | 5/2024 | Ghatak | G06F 16/2282 |
| 12,386,824 B1* | 8/2025 | Robichaud | G06F 16/24544 |
| 2003/0120652 A1* | 6/2003 | Tifft | G16H 10/60 |
| 2010/0153261 A1 | 6/2010 | Tseng et al. | |
| 2013/0007750 A1 | 1/2013 | Beckerle et al. | |
| 2013/0124263 A1 | 5/2013 | Amaro et al. | |
| 2014/0324753 A1* | 10/2014 | Grosof | G06N 5/025 |
| | | | 706/47 |
| 2014/0337271 A1* | 11/2014 | Cox | G06Q 40/00 |
| | | | 706/47 |
| 2014/0337272 A1* | 11/2014 | Cox | G06N 5/025 |
| | | | 706/47 |
| 2014/0369209 A1* | 12/2014 | Khurshid | H04L 41/0866 |
| | | | 370/250 |
| 2015/0193523 A1* | 7/2015 | Cox | G06N 5/027 |
| | | | 707/737 |
| 2015/0235327 A1 | 8/2015 | You | |
| 2015/0242762 A1* | 8/2015 | Cox | G06N 5/025 |
| | | | 706/11 |
| 2015/0379405 A1* | 12/2015 | Jenson | H04L 63/20 |
| | | | 706/47 |
| 2016/0098450 A1 | 4/2016 | Tandon et al. | |
| 2017/0109430 A1* | 4/2017 | Lall | G06F 16/285 |
| 2018/0204280 A1 | 7/2018 | Painter et al. | |
| 2018/0218032 A1 | 8/2018 | Wong et al. | |
| 2018/0276272 A1* | 9/2018 | Robichaud | G06F 3/04842 |
| 2018/0341688 A1* | 11/2018 | Ganesh | G06F 16/2465 |
| 2019/0012304 A1* | 1/2019 | Robichaud | G06F 16/2455 |
| 2019/0102375 A1* | 4/2019 | Goulikar | G06F 40/186 |
| 2019/0236601 A1 | 8/2019 | Izenson et al. | |
| 2019/0258628 A1* | 8/2019 | Roustant | G06F 16/248 |
| 2020/0097970 A1* | 3/2020 | Gupta | G06Q 20/4012 |
| 2020/0233857 A1 | 7/2020 | Fehling et al. | |
| 2020/0387835 A1* | 12/2020 | Sandepudi | G06N 20/20 |
| 2020/0394564 A1* | 12/2020 | Singh | G06N 3/08 |
| 2021/0142329 A1 | 5/2021 | Aparício et al. | |
| 2021/0218758 A1* | 7/2021 | Jain | G06F 9/545 |
| 2021/0224237 A1* | 7/2021 | Faruquie | G06N 5/01 |
| 2021/0263900 A1* | 8/2021 | Joyce | G06N 20/00 |
| 2021/0304207 A1* | 9/2021 | Lo Faro | G06Q 40/02 |
| 2021/0334654 A1* | 10/2021 | Himanshi | G06N 3/092 |
| 2021/0334698 A1* | 10/2021 | Vo | G06N 20/00 |
| 2021/0342337 A1* | 11/2021 | Lu | G06F 11/324 |
| 2021/0374756 A1* | 12/2021 | Pandey | G06N 3/08 |
| 2021/0377278 A1* | 12/2021 | Yin | H04L 63/0227 |
| 2022/0012817 A1* | 1/2022 | Singh | G06N 3/08 |
| 2022/0036239 A1* | 2/2022 | Bhatt | G06Q 10/067 |
| 2022/0067731 A1* | 3/2022 | Palaniappan | G06Q 20/407 |
| 2022/0122087 A1* | 4/2022 | Gosset | G06Q 20/027 |
| 2022/0188805 A1* | 6/2022 | Debellis | G06Q 20/065 |
| 2022/0374684 A1* | 11/2022 | Syngal | G06N 3/045 |
| 2022/0398573 A1 | 12/2022 | Robinson et al. | |
| 2023/0112250 A1* | 4/2023 | Agrawal | G06F 16/221 |
| | | | 707/714 |
| 2023/0169494 A1* | 6/2023 | Bialick | G06Q 20/227 |
| | | | 705/39 |
| 2023/0195706 A1* | 6/2023 | Horesh | G06F 16/245 |
| | | | 707/741 |
| 2023/0247001 A1* | 8/2023 | Nam | H04L 63/20 |
| | | | 726/11 |
| 2024/0119458 A1* | 4/2024 | Hoiles | G06N 20/00 |
| 2024/0135205 A1* | 4/2024 | Dash | G06N 5/025 |

FOREIGN PATENT DOCUMENTS

| | | | | |
|---|---|---|---|---|
| KR | 20210058525 | 5/2021 | | |
| KR | 20140121832 | 10/2024 | | |
| WO | WO-2021173777 A1 * | 9/2021 | | G06F 16/215 |
| WO | WO-2022087497 A1 * | 4/2022 | | G06F 16/36 |

OTHER PUBLICATIONS

International Search Report and Written Opinion for PCT Application No. PCT/US2024/013447 (Dated May 27, 2024).

International Search Report and Written Opinion for PCT Application No. PCT/US2024/013465 (Dated May 28, 2024).

International Search Report and Written Opinion for PCT Application No. PCT/US2024/013506 (Dated May 21, 2024).

\* cited by examiner $P = \{her, their, eye, iris, he, is\}$

Aho-Corasick Automaton:

Goto Function (trie) →

Failure Function ⇢

Nodes with output

```
"mcdonald's": [                                    604
    {
        "category": "Fast Food",
        "score": 1.0,
        "priority": 211,
        "conditions": []
    }
]
```

```
"payment": [                                       602
    {
        "category": "Credit Card Payments",
        "score": 1.0,
        "priority": 126,
        "conditions": [
            {
                "class": "GreaterThanCondition",
                "value": 0,
                "field": "value_amount"
            },
            {
                "class": "RegexMatchCondition",
                "value": "^2",
                "field": "account_type"
            }
        ]
    }
]
```

*FIG. 6*

SYSTEMS AND METHODS FOR PRIORITIZING RULES FOR AN EXPERT SYSTEM

CROSS-REFERENCE TO RELATED APPLICATIONS

The present application claims priority from Indian Patent Application No. 202311006291, filed Jan. 31, 2023, and titled EXPERT SYSTEMS IMPLEMENTING PRIORITI- ZATION TECHNIQUES FOR IMPROVED TRANSAC- TION CATEGORIZATION. The entire disclosure of the aforementioned priority application is hereby incorporated by reference herein.

FIELD OF THE DISCLOSURE

The field of the disclosure relates to transaction data analysis and, more particularly, to one or more expert systems configured to determine categorization fields for transaction data.

BACKGROUND

The volume of electronic transaction data created, pro- cessed, and stored by automated computer processes and logic is ever increasing. The volume of transaction data can include many millions, if not billions, of individual trans- action data pieces. Categorization of transactions within such electronic transaction data is challenging. Variations and variability across transaction processing systems and within the transaction data increases the complexity and performance of automated transaction analysis systems. In addition, management of such electronic transaction data, such as by organizing or characterizing the electronic trans- action data, is complex due to the volume of the electronic transaction data and the variability and multifaceted char- acteristics of such transaction data.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computing system is provided. The computing system includes a database, one or more proces- sors, and a memory. The database includes a plurality of predefined rules and labeled transaction data. Each pre- defined rule includes one or more conditions and is associ- ated with an assigned category. The labeled transaction data includes a plurality of individual labeled transactions. Each labeled transaction is associated with an assigned category. The memory includes computer-executable instructions thereon, that when executed by the one or more processors, cause the one or more processors to perform operations that include receiving the plurality of predefined rules from the database and receiving the labeled transaction data from the database. The one or more processors create a potential rule list on the database and store the plurality of predefined rules in the potential rule list on the database. Furthermore, the one or more processors create an ordered rule list, a ruleto-transaction lookup table, and a transaction-to-rule lookup table on the database. In addition, the one or more processors apply each respective predefined rule to each labeled trans- action and identify each labeled transaction for which each predefined rule is true. The predefined rule is true when all one or more conditions of the predefined rule are true for the respective labeled transaction. Additionally, the one or more processors add each predefined rule and the identified labeled transactions to the rule-to-transaction lookup table and the transaction-to-rule lookup table by linking each of the respective identified labeled transactions with each of the respective predefined rules that are true for that respective identified labeled transaction. Moreover, the one or more processors generate a priority-ordered list of the plurality of predefined rules in an iterative manner until all predefined rules have been removed from the potential rule list. The iterative process includes, in each iteration round, for each predefined rule in the potential rule list, calculating an accuracy based on all labeled transactions for which the rule is true. Furthermore, the iterative process includes append- ing the highest accuracy predefined rules to the ordered rule list and removing the predefined rules appended to the ordered rule list from the potential rule list. In addition, the iterative process includes, for each labeled transaction in the rule-to-transaction lookup table that corresponds to the predefined rules moved to the ordered rule list, removing the respective labeled transactions from all entries in the rule- to-transaction lookup table.

In another aspect, a method for prioritizing a plurality of rules for an expert system is provided. The method includes receiving a plurality of predefined rules from a database. Each predefined rule includes one or more conditions and is associated with an assigned category. The method also includes receiving labeled transaction data from the data- base. The labeled transaction data includes a plurality of individual labeled transactions. Each labeled transaction is associated with an assigned category. Moreover, the method includes creating a potential rule list on the database and storing the plurality of predefined rules in the potential rule list on the database. Furthermore, the method includes creating an ordered rule list, a rule-to-transaction lookup table, and a transaction-to-rule lookup table on the database. The methods includes applying each respective predefined rule to each labeled transaction. Additionally, the method includes identifying each labeled transaction for which each predefined rule is true, wherein the predefined rule is true when all one or more conditions of the predefined rule are true for the respective labeled transaction. Furthermore, the method includes adding each predefined rule and the iden- tified labeled transactions to the rule-to-transaction lookup table and the transaction-to-rule lookup table by linking each of the respective identified labeled transactions with each of the respective predefined rules that are true for that respec- tive identified labeled transaction. In addition, the method includes generating a priority-ordered list of the plurality of predefined rules in an iterative manner until all predefined rules have been removed from the potential rule list. In each iteration round, the method includes, for each predefined rule in the potential rule list, calculating an accuracy based on all labeled transactions for which the rule is true; append- ing the highest accuracy predefined rules to the ordered rule list; removing the predefined rules appended to the ordered rule list from the potential rule list; and for each labeled transaction in the rule-to-transaction lookup table that cor- responds to the predefined rules moved to the ordered rule list, removing the respective labeled transactions from all entries in the rule-to-transaction lookup table.

In yet another aspect, a non-transitory computer-readable storage media is provided. The non-transitory computer-readable storage media has computer-executable instructions stored thereon, which when executed by one or more processors, the computer-executable instructions cause the one or more processors to receive a plurality of predefined rules from a database. Each predefined rule includes one or more conditions and is associated with an assigned category. The computer-executable instructions cause the one or more processors to receive labeled transaction data from the database. The labeled transaction data includes a plurality of individual labeled transactions. Each labeled transaction is associated with an assigned category. Furthermore, the computer-executable instructions cause the one or more processors to create a potential rule list on the database and store the plurality of predefined rules in the potential rule list on the database. The computer-executable instructions also cause the one or more processors to create an ordered rule list, a rule-to-transaction lookup table, and a transaction-to-rule lookup table on the database. In addition, the computer-executable instructions cause the one or more processors to apply each respective predefined rule to each labeled transaction and identify each labeled transaction for which each predefined rule is true. The predefined rule is true when all one or more conditions of the predefined rule are true for the respective labeled transaction. Additionally, the computer-executable instructions cause the one or more processors to add each predefined rule and the identified labeled transactions to the rule-to-transaction lookup table and the transaction-to-rule lookup table by linking each of the respective identified labeled transactions with each of the respective predefined rules that are true for that respective identified labeled transaction. Furthermore, the computer-executable instructions cause the one or more processors to generate a priority-ordered list of the plurality of predefined rules in an iterative manner until all predefined rules have been removed from the potential rule list. In each iteration round, the computer-executable instructions cause the one or more processors to, for each predefined rule in the potential rule list, calculate an accuracy based on all labeled transactions for which the rule is true; append the highest accuracy predefined rules to the ordered rule list; remove the predefined rules appended to the ordered rule list from the potential rule list; and for each labeled transaction in the rule-to-transaction lookup table that corresponds to the predefined rules moved to the ordered rule list, remove the respective labeled transactions from all entries in the rule-to-transaction lookup table.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 illustrates two (2) example relevant rules that may be returned by the expert system model of FIG. 4 for an example transaction;

Figure 1:
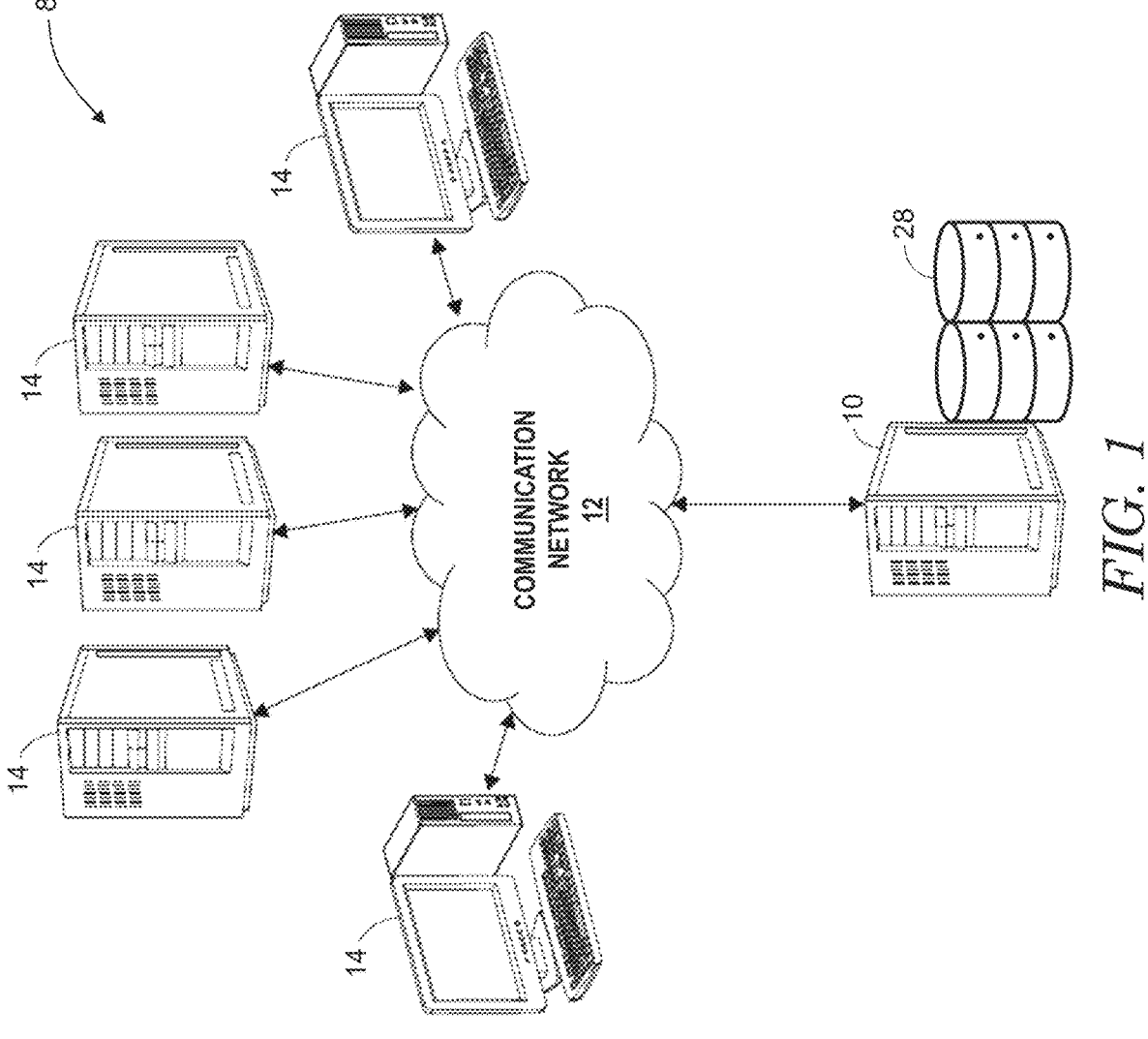
FIG. 1 depicts an exemplary system in which embodiments of a server may be utilized for providing data mining services, for example, on large batches of business data.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

The embodiments described herein overcome the problems described above by providing an expert system model capable of processing large volumes of raw transaction data. For example, and without limitation, the expert system model described herein is capable of reducing, by a factor of about four thousand (4,000), the number of rules used to facilitate categorizing the many millions, if not billions, of individual transactions processed by a payment processing network. The system performs automated prioritization of large rule datasets using a sequence of unique prioritization techniques that include automatic rule filtering, rule prioritization, and super rule/subrule identification. Within the system, labeling of automatically prioritized text included in the transaction entries may be performed using the expert system model. Efficient automated categorization of transactions included in large transaction datasets may be performed by the system using closed-loop iterative statistical rule analysis built on automatically prioritized keywords and rules.

Exemplary System

FIG. 1 depicts an exemplary system 8 in which embodiments of a server 10 may be utilized for open banking transaction categorization/enrichment, for example, on large batches of business data (e.g., transaction data and the like). The environment may include a communication network 12 and a plurality of data source computing devices 14. Each data source computing device 14 may include a desktop computer, a laptop or tablet computer, an application server, a database server, a file server, or the like, or combinations thereof, configured to periodically or continuously provide data and/or data updates to the server 10 for storing, for example, in a database 28. The server 10 may include and/or work in conjunction with application servers, database servers, file servers, gaming servers, mail servers, print servers, or the like, or combinations thereof. Furthermore, the server 10 may 10 may include a plurality of servers, virtual servers, or combinations thereof.

The communication network 12 may provide wired and/or wireless communication between the data source computing devices 14 and the server 10. Each of the server 10 and data source computing devices 14 may be configured to send data to and/or receive data from the communication network 12 using one or more suitable communication protocols, which may be the same communication protocols or different communication protocols as one another.

The communication network 12 generally allows communication between the data source computing devices 14 and the server 10. For example, the data source computing devices 14 may upon request, periodically and/or continuously push or otherwise provide new or updated data to the server 10 over the communication network 12.

The communication network 12 may include one or more telecommunication networks, nodes, and/or links used to facilitate data exchanges between one or more devices and may facilitate a connection to the Internet for devices configured to communicate with the communication network 12. The communication network 12 may 12 may include local area networks, metro area networks, wide area networks, cloud networks, the Internet, cellular networks, plain old telephone service (POTS) networks, and the like, or combinations thereof.

The communication network 12 may be wired, wireless, or combinations thereof and may include components such as modems, gateways, switches, routers, hubs, access points, repeaters, towers, and the like. The data source computing devices 14 and the server 10 may connect to the communication network 12 either through wires, such as electrical cables or fiber optic cables, or wirelessly, such as radio frequency (RF) communication using wireless standards such as cellular 3G, 4G, 5G, and the like, Institute of Electrical and Electronics Engineers (IEEE) 802.11 standards such as Wi-Fi, IEEE 802.16 standards such as WiMAX, Bluetooth™, or combinations thereof. In aspects in which the network 12 facilitates a connection to the Internet, data communications may take place over the network 12 via one or more suitable Internet communication protocols. For example, the network 12 may be implemented as a wireless telephony network (e.g., GSM, CDMA, LTE, etc.), a Wi-Fi network (e.g., via one or more IEEE 802.11 Standards), a WiMAX network, a Bluetooth network, etc.

Figure 3:
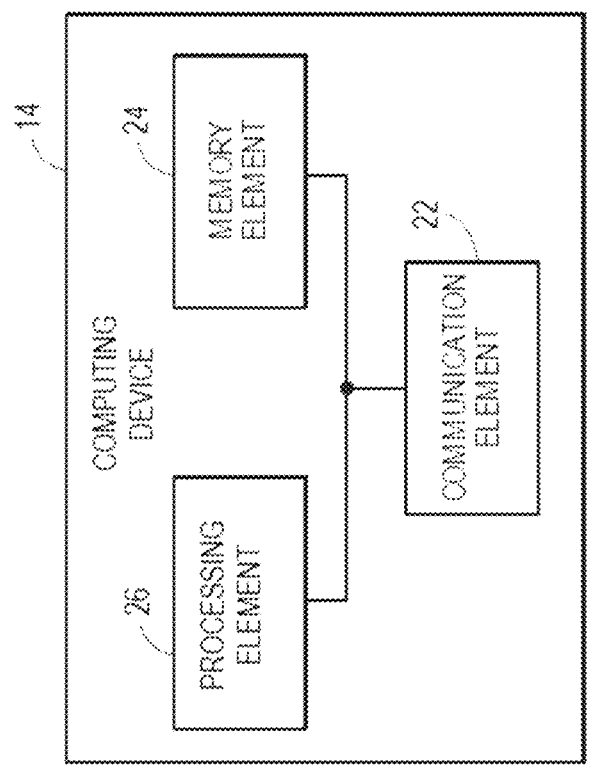
FIG. 3 is an example configuration of a data source computing device for use in the system shown in FIG. 1.
Figure 2:
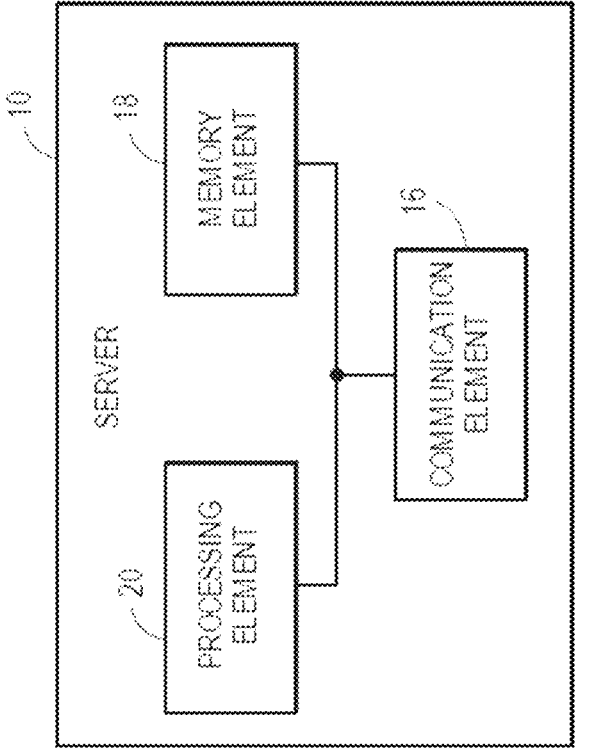
FIG. 2 is an example configuration of a server for use in the system shown in FIG. 1.

The server 10 generally retains electronic data and may respond to requests to retrieve data, as well as to store data. The server 10 may be configured to include or execute software, such as file storage applications, database applications, email or messaging applications, web server applications, and/or expert system software or the like. As indicated in FIG. 2, the server 10 may broadly include a communication element 16, a memory element 18, and a processing element 20. Likewise, as indicated in FIG. 3, each of the data source computing devices 14 may broadly include a communication element 22, a memory element 24, and a processing element 26.

The communication elements 16, 22 each generally allow communication with external systems or devices, including the communication network 12, such as via wireless communication and/or data transmission over one or more direct or indirect radio links between devices. The communication elements 16, 22 each may include signal or data transmitting and receiving circuits, such as antennas, amplifiers, filters, mixers, oscillators, digital signal processors (DSPs), and the like. The communication elements 16, 22 each may establish communication wirelessly by utilizing RF signals and/or data that comply with communication standards such as cellular 2G, 3G, or 4G, Wi-Fi, WiMAX, Bluetooth™, and the like, or combinations thereof. In addition, the communication elements 16, 22 each may utilize communication standards such as ANT, ANT+, Bluetooth™ low energy (BLE), the industrial, scientific, and medical (ISM) band at 2.4 gigahertz (GHz), or the like.

Alternatively, or in addition, the communication elements 16, 22 each may establish communication through connectors or couplers that receive metal conductor wires or cables which are compatible with networking technologies, such as ethernet. In certain embodiments, the communication elements 16, 22 each may also couple with optical fiber cables. The communication elements 16, 22 each may be in communication with corresponding ones of the processing elements 20, 26 and the memory elements 18, 24, via, e.g., wired or wireless communication.

The memory elements 18, 24 each may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 18, 24 each may be embedded in, or packaged in the same package as, the corresponding one of the processing elements 20, 26. The memory elements 18, 24 each may include, or may constitute, a "computer-readable medium." The memory elements 18, 24 each may store computer-executable instructions, code, code segments, software, firmware, programs, applications, apps, modules, agents, services, daemons, or the like that are executed by the processing elements 20, 26, including—in the case of processing element 20 and the memory element 18—the expert system software or the like. The memory elements 18, 24 each may also store settings, data, documents, sound files, photographs, movies, images, databases, and the like, including the items described throughout this disclosure.

The processing elements 20, 26 each may include electronic hardware components such as processors. The processing elements 20, 26 each may include digital processing unit(s). The processing elements 20, 26 each may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 20, 26 each may generally execute, process, or run computer-executable instructions, code, code segments, software, firmware, programs, applications, apps, modules, agents, processes, services, daemons, or the like, including—in the case of processing element 20—one or more expert system models and/or data analysis processes described throughout this disclosure. The processing elements 20, 26 each may also include hardware components such as finite-state machines, sequential and combinational logic, and other electronic circuits that can perform the functions necessary for the operation of the current invention. The processing elements 20, 26 each may be in communication with the other electronic components through serial or parallel links that include address busses, data busses, control lines, and the like.

Through hardware, software, firmware, or combinations thereof, the processing elements 20, 26 each may be configured or programmed to perform the functions described hereinbelow.

Exemplary Computer-Implemented Methods

Figure 4:
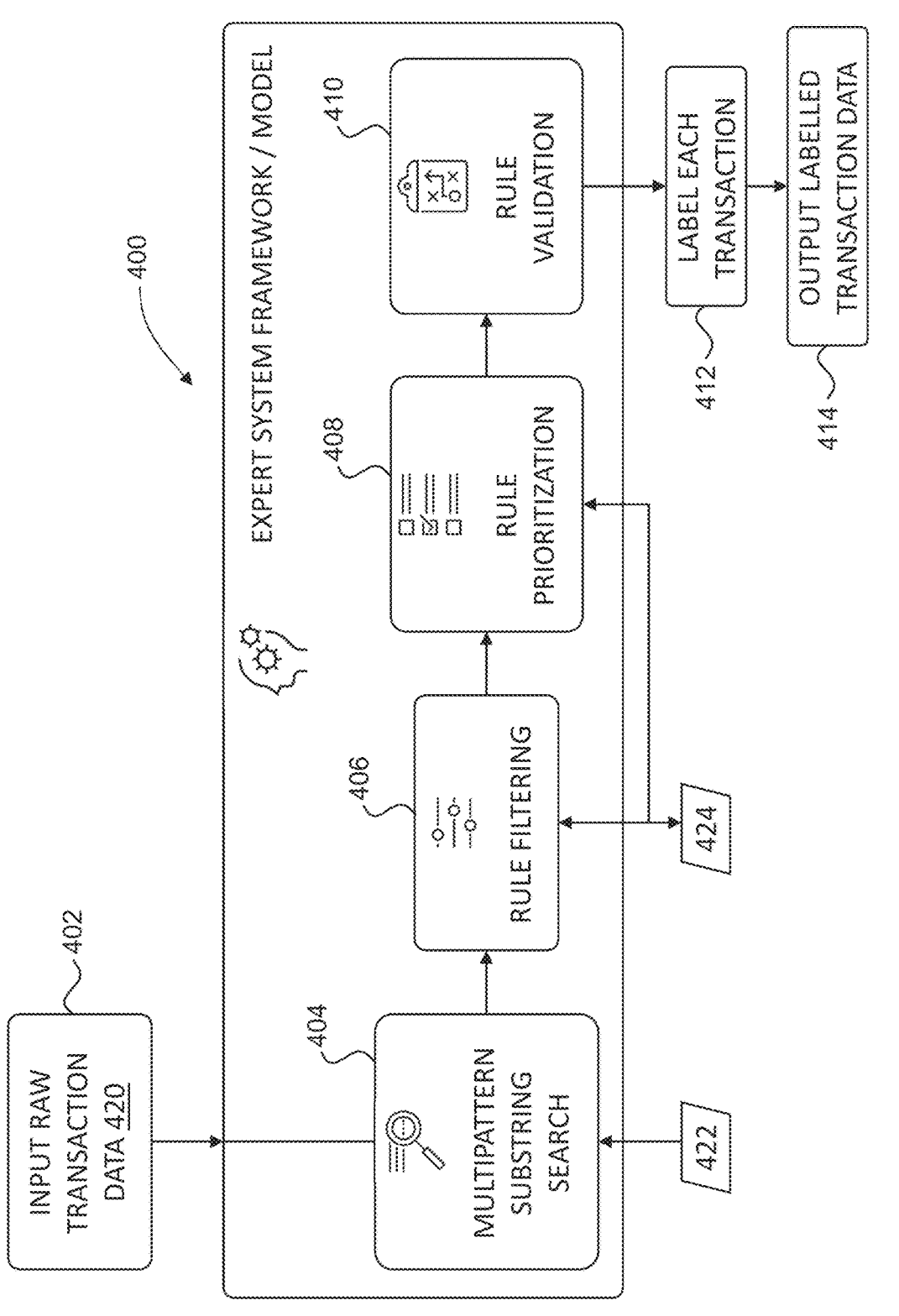
FIG. 4 is a flowchart illustrating a framework of an expert system model for open banking transaction categorization and enrichment using rule prioritization techniques.

FIG. 4 is a flowchart illustrating a framework of an expert system model 400 for open banking transaction categorization and enrichment using rule prioritization techniques. The operations described herein may be performed in the order shown in FIG. 4 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The expert system model 400 is described below, for ease of reference, as being executed by exemplary devices and components introduced with the embodiments illustrated in FIGS. 1-3. In one embodiment, the expert system model 400 is implemented by the server 10 (shown in FIG. 1). In the exemplary embodiment, the expert system model 400 relates to novel techniques for categorizing and enriching open banking transaction data by implementing unique rule prioritization procedures. While operations within the expert system model 400 are described below regarding the server 10, according to some aspects of the present invention, the expert system model 400 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 402, raw transaction data 420 (e.g., financial transaction data) is input to the expert system model 400. For example, in one embodiment, the server 10 may retrieve the raw transaction data 420 from the database 28. Alternatively, or in addition, the server 10 may receive raw transaction data 420 from one or more of the data source computing devices 14 (shown in FIG. 1). In an embodiment, the raw transaction data 420 includes a plurality of individual pieces of transaction data, wherein each individual piece corresponds to a respective transaction. Each respective piece of transaction data includes a plurality of data fields, including, for example, a description data field, a memo data field, an amount data field, and a transaction type data field. In some embodiments, one or more of the data fields include text data. It is contemplated, however, that the data fields may include any type of data or data structure that enables the expert system model 400 to function as described herein.

At operation 404, the server 10, via the expert system model 400, performs a multipattern substring matching operation on the raw customer data. Multipattern substring matching or searching is a technique used to efficiently find occurrences of multiple patterns within a given text or dataset, such as the raw customer data. This technique is particularly useful in scenarios where there are a set of rules or conditions represented by "regular expression" (regex) patterns, and the rules that need to be checked against a given input need to be filtered down. A "regular expression" is a pattern (or filter) that describes a set of strings that matches the pattern. In other words, a regex accepts a certain set of strings and rejects the rest.

In the example embodiment, the multipattern substring matching operation is configured to identify one or more predefined keywords 422 (or regex patterns) contained in one or more of the description and memo data fields of a respective piece of transaction data. In particular, the expert system model 400 identifies substring patterns using, for example, a string-searching algorithm, as described herein. If the expert system model 400 cannot identify one or more of the predefined keywords 422 in the description and/or memo data fields, that respective piece of transaction data is flagged and rejected for further processing by the expert system model 400.

For example, in an embodiment, the string-searching algorithm retrieves the predefined keywords 422 (or regex patterns), for example, from the database 28. The predefined keywords 422 may represent one or more rules or conditions. Each keyword (regex pattern) may correspond to a specific rule that needs to be checked against the raw customer data. The predefined keywords 422 include a list of keywords assembled by one or more human experts, wherein the keywords are known words used in the memo and description data fields of transaction data. The keywords may include, for example, and without limitation, merchant names (e.g., McDonald's, YouTube, YouTube Music, etc.) and transaction types (i.e., paycheck, refund, etc.).

Figure 5:
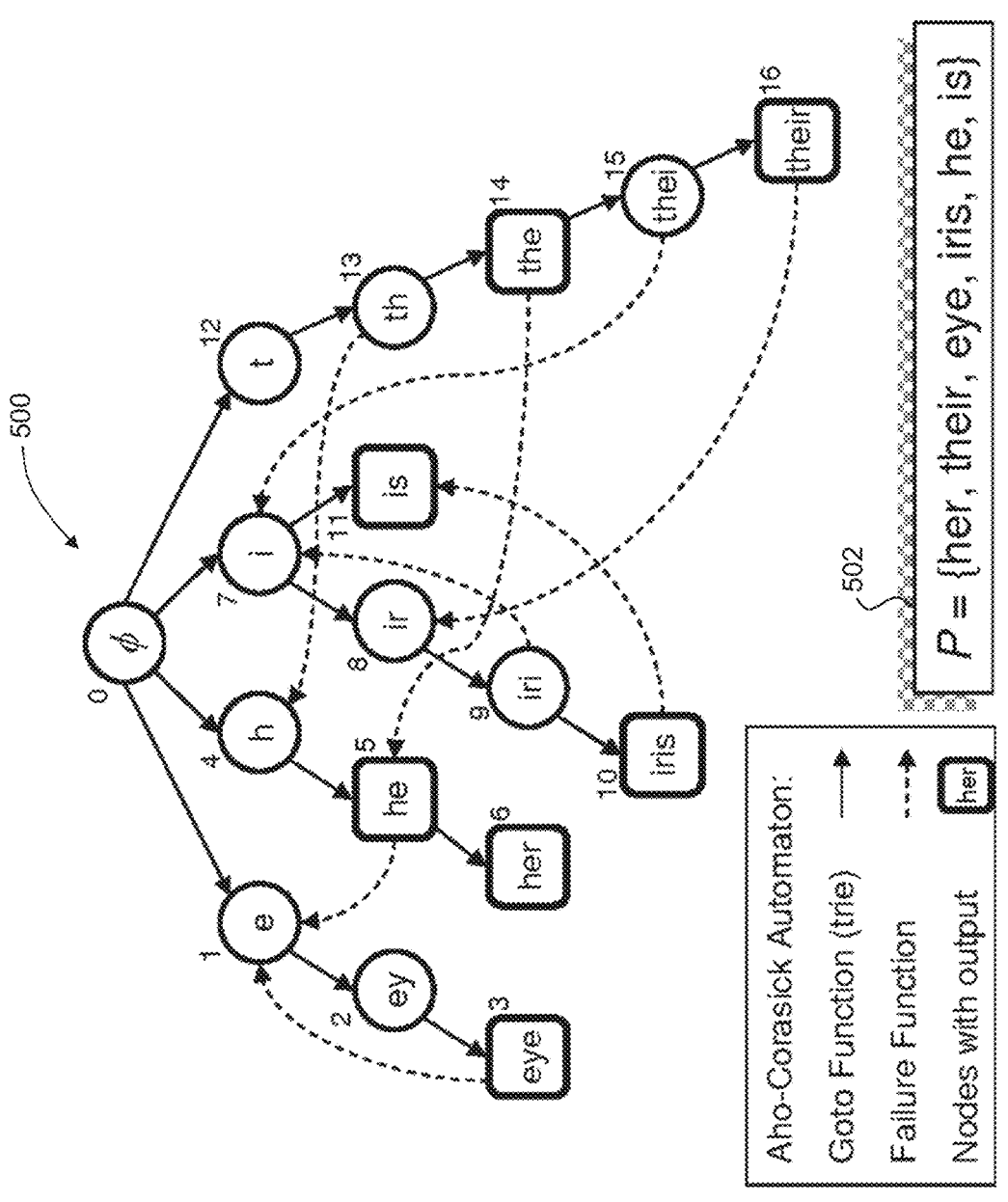
FIG. 5 illustrates an example trie structure for a string-searching algorithm of the expert system model of FIG. 4.

In the example, the string-searching algorithm is a kind of dictionary-matching algorithm that locates elements of a finite set of keywords or strings (i.e., a "dictionary") within each respective transaction of the raw transaction data 420. The string-searching algorithm preprocesses the keywords into a trie structure. FIG. 5 illustrates an example trie structure for the string-searching algorithm based on an example dictionary 502 consisting of the keywords {her, their, eye, iris, he, is}. In the depicted trie structure, there is an arrow with a solid line from each node to a node whose name is found in the dictionary 502 by appending one character. The dashed line arrows extend from each node to the node that is a suffix of it in the trie structure. For example, for node (the), its suffix is (he) and (e). This trie structure allows for quick searching of the keywords (i.e., substrings) while iterating through the description and memo data fields just one time. In a preferred embodiment, the string-searching algorithm is the Aho-Corasick multi-pattern substring search algorithm. It is contemplated however that other string-searching algorithms may be used to identify one or more predefined keywords 422 contained in one or more of the description and memo data fields of a respective piece of transaction data.

Referring to FIG. 4, at operation 406, the expert system model 400 performs a rule filtering operation. For example, in an embodiment, each of the identified keywords is mapped to one or more corresponding rules 424, as noted above. Accordingly, for each respective piece of transaction data including a keyword in one or more of the description and memo data fields, the keyword mapping identifies only those rules that are applicable to the respective piece of transaction data. The rule filtering operation facilitates filtering an entire expert system rules tree down to just the rules (or nodes) where there is a possibility of the corresponding rule(s) to be true.

In the example embodiment, the rules 424 for the expert system model 400 are defined by one or more human experts. As used herein, a rule is a set of conditions that is assigned a category, such that when all conditions are true for a given transaction, the transaction is labeled with that category. A condition is a simple Boolean statement that is checked on a respective transaction. Example conditions may include the following:

"giant" in desc_memo value_amount<0 account_type=200 regex "giant \d{2,4}" match found in desc_memo

Example rules may include the following, wherein the bold, italicized text indicates the category to be assigned if all the conditions are met:

"giant" in desc_memo and regex "giant \d{2,4}" match found in desc_memo→*Groceries*

"payment" in desc_memo and account_type=200 and value_amount>0→*Credit Card Payments*

In the exemplary embodiment, all the rules 424 include at least one keyword in the description and/or memo data field of the transaction data as a condition. As described above, if the expert system model 400 cannot identify one or more of the predefined keywords 420 in the description and/or memo data fields, that respective piece of transaction data is flagged and rejected for further processing by the expert system model 400. All rules first check if a keyword exists, then check the other conditions of the respective rule.

In an example, a transaction includes the keywords "payment" and "mcdonald's" and was performed for a value of −$20 (i.e., a debit). From the keywords that are identified, the expert system model 400 retrieves the relevant rules from the set of rules 424. As discussed above, each of the identified keywords is mapped to one or more corresponding rules 424. Thus, the relevant rules may be quickly identified via a lookup, for example, in a table, hashmap, dictionary lookup, etc. FIG. 6 illustrates two (2) example rules 602 and 604 that may be returned for the example transaction. Rule 602 includes the keyword "payment," and as such, was returned as a relevant rule for the transaction. Likewise, rule 604 includes the keyword "mcdonald's." The example rules 602 and 604 are depicted in JSON (JavaScript Object Notation) format. It is contemplated, however, that the rules may be formatted in any manner that enables the expert system model 400 to function as described herein.

Referring to FIG. 4, at operation 408, the expert system model 400 performs a rule prioritization operation. In an embodiment, for each respective piece of transaction data, after all rules identified for the corresponding keywords are returned, the rules are ordered based on a priority of the rules. As used herein, priority is simply the order that the rules (or nodes) would exist in the expert system decision tree. Priority is determined, for example, by a rule prioritization model 800 (see FIG. 8), which is described more fully below. Referring to FIG. 6, the example rule 602 includes a priority of "126," whereas the example rule 604 has a priority of "211." As such, rule 602 is ordered before rule 604. For example, referring to FIG. 7, the expert system model 400 generates a final rules list 702, in which each of the identified relevant rules are combined into a priority-ordered list.

Referring to FIG. 4, at operation 410, the expert system model 400 performs a rule validation operation. For example, in the example embodiment, after the identified rules are ordered by priority (in operation 408), the rules are checked one by one, in order of priority, to determine whether a respective rule is true. At this point, the expert system model 400 functions as a traditional expert system, except that the previous operations have reduced the decision tree from an original size (typically greater than forty thousand (40,000) nodes) to a substantially smaller size (typically less than ten (10) rules). Thus, the expert system model 400 described herein facilitates significantly increasing the efficiency of the server 10 by reducing the number of rules (or nodes) to be analyzed by a factor of about four thousand (4,000). Such a reduction not only significantly increases the processing efficiency of the server 10, but also significantly reduces the cost of operating the server 10. Furthermore, reducing the server operating cost facilitates reducing energy consumption and capital expenditure, for example, by enabling less powerful and more efficient servers and/or computing devices to be used.

Figure 7:
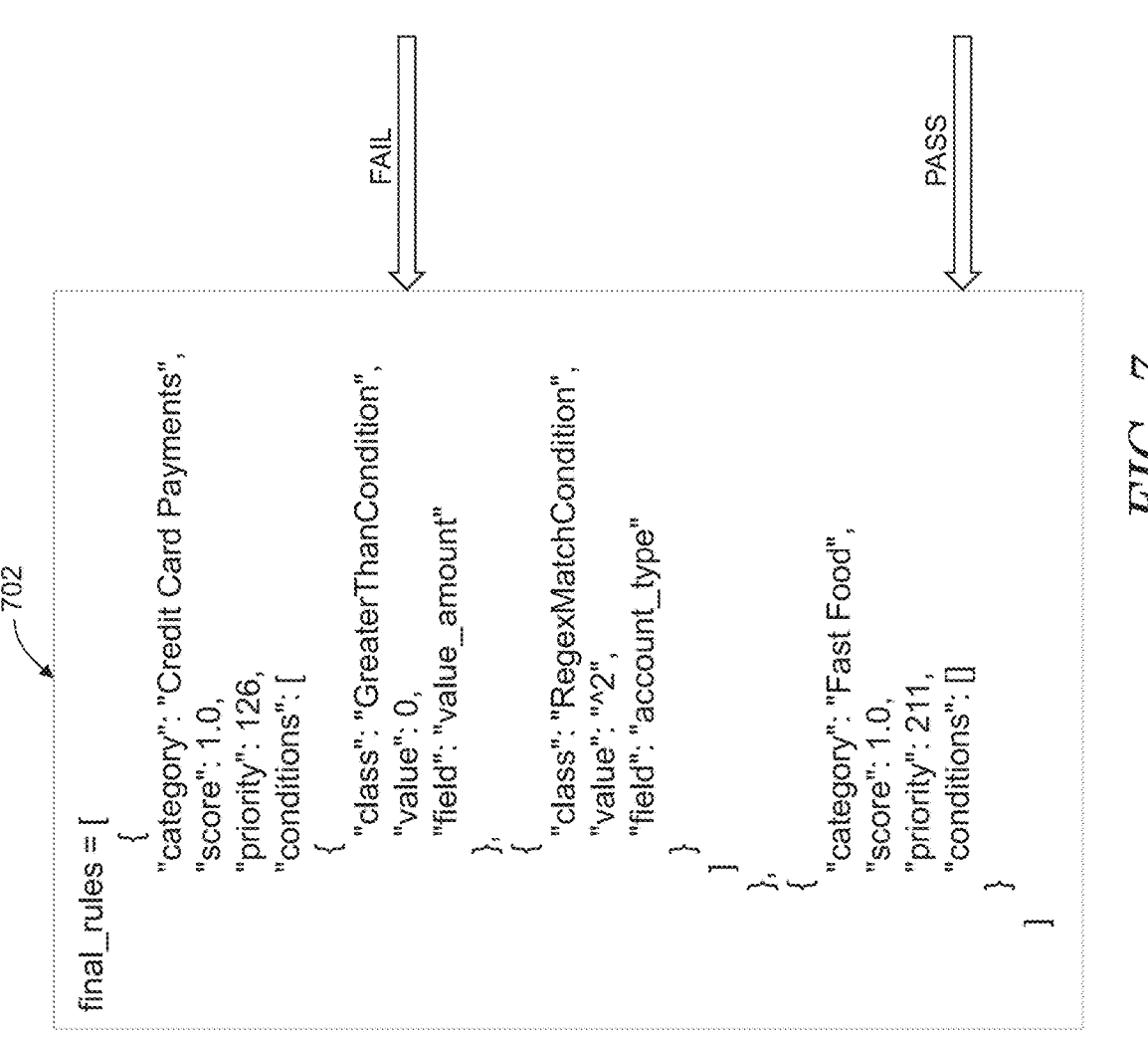
FIG. 7 illustrates a final rules list, in which each of the identified relevant rules of FIG. 6 are combined into a priority-ordered list.

Referring to FIG. 7, in the example discussed above, the first rule fails because the condition of a value greater than "0" is not met. As noted above, the transaction was performed for a value of −$20 (i.e., a debit). Thus, the expert system model 400 moves to the net rule in the final rules list. The conditions of this rule, of which there are none, are met.

Referring to FIG. 4, at operation 412, the expert system model 400 applies a category label to each piece of transaction data (i.e., each transaction) based on the first, or highest priority, rule that is determined to be true. For example, in an embodiment, the predefined keywords are mapped to categories. Because the rules are filtered and applied to each piece of transaction data based on the identified keywords, each respective piece of transaction data is labeled with the category associated with the keyword used with the highest priority rule that was determined to be true. In the example discussed above, the second rule (i.e., rule 604) is met, and thus the respective transaction is labeled with the category "Fast Food." At operation 414, the server 10 outputs labeled transaction data. Thus, as described herein, the expert system model 400 receives raw transaction data as input and outputs labeled transaction data, wherein each transaction is output with a category label.

Figure 8:
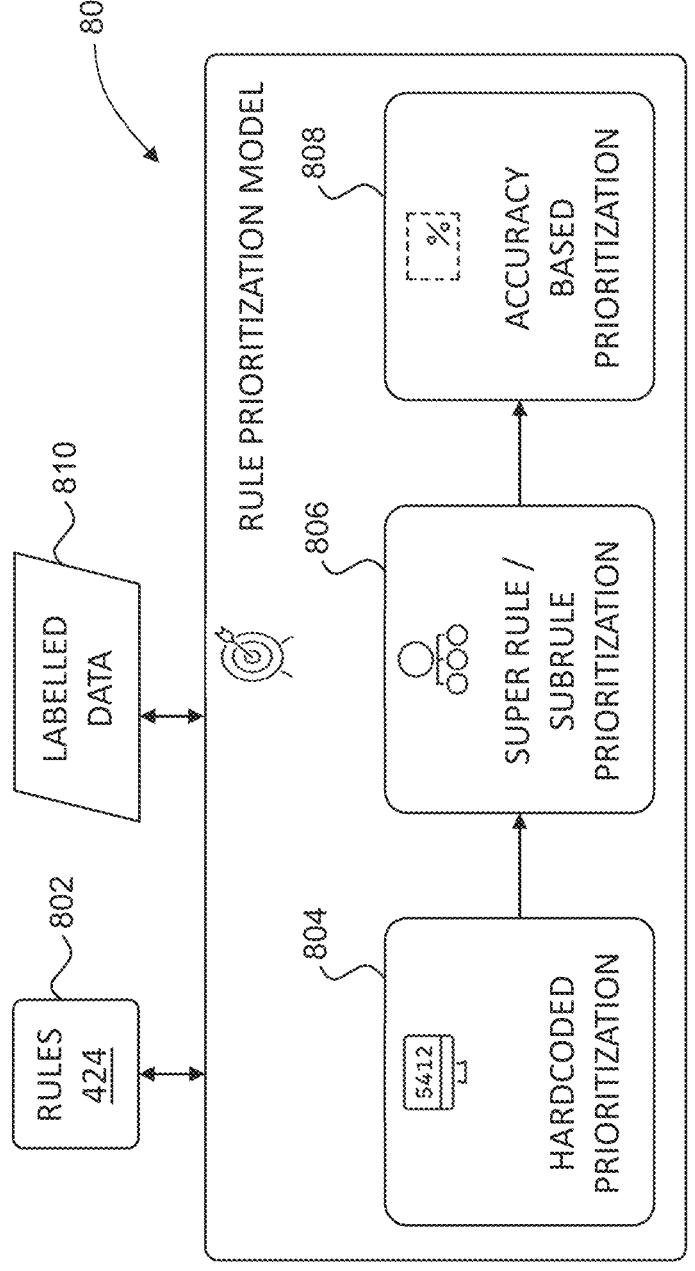
FIG. 8 is a flowchart illustrating a framework of a rule prioritization model for determining the priorities of the rules of the expert system model of FIG. 4.

FIG. 8 is a flowchart illustrating a framework of the rule prioritization model 800 for determining the priorities of the rules 424 of the expert system model 400. The operations described herein may be performed in the order shown in FIG. 8 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The rule prioritization model 800 is described below, for ease of reference, as being executed by exemplary devices and components introduced with the embodiments illustrated in FIGS. 1-3. In one embodiment, the rule prioritization model 800 is implemented by the server 10 (shown in FIG. 1). In the exemplary embodiment, the rule prioritization model 800 relates to novel techniques for prioritizing a plurality of rules for an expert system by implementing unique rule prioritization procedures. While operations within the rule prioritization model 800 are described below regarding the server 10, according to some aspects of the present invention, the rule prioritization model 800 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

At operation 802, the plurality of rules 424 is input to the rule prioritization model 800. For example, in one embodiment, the server 10 may retrieve the rules 424 from the database 28. The rule prioritization model 800 orders the priority in which the rules 424 should be checked by the expert system model 400. Think of it as ordering the decision tree of an expert system. For a small decision tree in an expert system, it would be best to simply write the entire tree manually. However, when the rule 424 includes tens of thousands of rules, it is infeasible to manually determine which nodes should come first in the decision tree. As such, the rule prioritization model 800 determines the priority of the priority rules automatically. In the example embodiment, the rule prioritization model 800 includes three (3) components: 1) hardcoded prioritization; 2) super rule/subrule prioritization; and 3) accuracy-based prioritization.

At operation 804, the rule prioritization model 800 determines whether any of the rules 424 have a hardcoded or prior-assigned priority and orders the rules in order of priority based on the hardcoded or prior-assigned priority values. In the example embodiment, one or more of the rules 424 has been assigned a priority by one or more human experts. An example for the raw transaction data processing described herein includes prioritizing rules associated with the keyword "paycheck" higher than rules associated with most other keywords. This is in part because a transaction associated with the keyword "paycheck" should be categorized as a paycheck instead of the entity or business that performed the transaction (e.g., a paycheck from mcdonald's should be categorized as "Paycheck" rather than "Fast Food"). It is noted that any of the rules 424 having a prior-assigned priority begin at the highest priority (e.g., priority "1") and continue consecutively downward in priority. That is, prior-assigned priority rules are prioritized from 1–n, with n being the lowest prior-assigned priority rule. In this manner, the additional operations of the rule prioritization model 800 cannot place a rule above any of the prior-assigned priority rules.

At operation 806, the rule prioritization model 800 performs a super rule/subrule prioritization operation on the rules 424 that do not have a prior-assigned priority. This is to ensure that super rules have a higher priority than their associated subrules, which is based on, for example, the keywords associated with the respective rules. A rule is a subrule to a super rule if the super rule being true implies that the subrule is also true. For example, a transaction may include the keyword "YouTube" in the description and/or memo data field. Any rule associated with the keyword "YouTube" would be a subrule of any rule associated with the keyword "YouTube Music." This is because "YouTube" is a substring of the string "YouTube Music." If "YouTube Music" is contained in the description and/or memo data field of a transaction, this implies that "YouTube" is in the description and/or memo data field. Consequently, all rules that are associated with "YouTube" and "YouTube Music" would be returned.

For the model to perform accurately, super rules cannot follow their associated subrules, because the model is configured to exit whenever a rule is determined to be true. If the super rule is true, the subrule will also be true, so the super rule will never be reached by the expert system model 400 if the subrule is evaluated before the super rule.

Accordingly, the rule prioritization model 800 determines all rules (super rule and subrules) associated with each keyword. The rule prioritization model 800 then automatically prioritizes the super rule over its associated subrules. In this manner, the super rules and associated subrules are prioritized relative to each other, but not relative to other rules in the plurality of rules 424.

At operation 808, the rule prioritization model 800 performs an accuracy based prioritization operation on the rules 424 that do not have a prior-assigned priority. This is because one wants higher accuracy rules to be applied before lower accuracy rules. In the example embodiment, the rules 424 are ordered by their accuracy as compared to previously labeled data 810. The labeled data 810 includes a plurality of transactions (or transaction data pieces) that are manually labeled by human operators.

In the exemplary embodiment, the rule prioritization model 800 is "trained" via an iterative process. This technique of "training" an expert system is completely novel. The rule prioritization model 800 gathers all the rules 424 that do not have a prior-assigned priority into a list called a "potential rule list," which is written to memory of the computing device executing the rule prioritization model 800. The rule prioritization model 800 then initializes an empty list for ordered/prioritized rules called an "ordered rule list," which is written to memory of the computing device executing the rule prioritization model 800. Furthermore, the rule prioritization model 800 initializes a rule-to-transaction lookup table and a transaction-to-rule lookup table. For example, the potential rule list, the ordered rule list, rule-to-transaction lookup table, and transaction-to-rule lookup table may be generated and written to the database 28 (shown in FIG. 1).

For each rule contained in the potential rule list, the rule prioritization model 800 identifies all transactions in the labeled data 810 for which the respective rule is true, for example, by applying the respective rule to each transaction. The rule prioritization model 800 then adds the "true" rule and the identified transactions to the rule-to-transaction lookup table and the transaction-to-rule lookup table, for example, by linking the "true" rule to the identified transactions in the tables. Note here that "true" does not equal accuracy. A rule is true if all conditions of the rule are true. A rule is accurate if the rule category matches the labeled data category of a transaction for which the rule is true.

For each rule, the rule prioritization model 800 then calculates an accuracy based on all transactions in the rule-to-transaction lookup table for which the rule is true. In an example, the labeled data 810 includes fifteen (15) transactions with "YouTube" in the description and/or memo data field categorized as "Streaming Service" and five (5) transactions with "YouTube Music" in the description and/or memo data field categorized as "Music." A hypothetical rule states that a transaction having the keyword "YouTube" in the description and/or memo data field is to be labeled as "Streaming Service." This hypothetical rule would be true for all twenty (20) transactions. The hypothetical rule, however, would only be accurate for fifteen (15) transactions (e.g., a seventy-five percent (75%) accuracy). Another hypothetical rule that states that a transaction that has the keyword "YouTube Music" in description and/or memo data field is to be labeled as "Music" would only be true for five (5) transactions but would be accurate for all five (5) transactions, thereby providing an accuracy of one hundred percent (100%).

The rule prioritization model 800 removes the highest accuracy rules (or most accurate rules) from the potential rule list and adds them to the ordered rule list. More particularly, the rule prioritization model 800 appends the highest accuracy rules to the ordered rule list and assigns each rule the next consecutive priority number. For example, as described above, the "YouTube Music" rule was one hundred percent (100%) accurate and "YouTube" rule was only seventy-five percent (75%) accurate. In this example, the rule prioritization model 800 removes the "YouTube Music" rule from the potential rule list and appends it to the bottom of the ordered rule list.

For each transaction in the rule-to-transaction lookup table that corresponds to the rule(s) moved to the ordered rule list, the rule prioritization model 800 removes the respective transaction from all entries in the rule-to-transaction lookup table. To facilitate increasing the speed of removing the transactions, the rule prioritization model 800 uses the transaction-to-rule lookup table to quickly identify each other rule associated with the transactions. These transactions are removed from all the other rule associations in the rule-to-transaction lookup table because the transactions would be labeled with the removed rules.

The rule prioritization model 800 then recalculates the accuracy of each affected rule (i.e., the rules where the corresponding transaction list in the rule-to-transaction lookup table changed). The rule prioritization model 800 then removes the highest accuracy rules again from the potential rule list and adds them to the ordered rule list. For each transaction in the rule-to-transaction lookup table that corresponds to the additional rule(s) moved to the ordered rule list, the rule prioritization model 800 removes the respective transaction from all entries in the rule-to-transaction lookup table. These steps are repeated until all rules have been removed from the potential rule list and added to the ordered rule list (or priority-ordered list).

It is noted that the highest accuracy rule(s), as determined by the rule prioritization model 800 during one of its iterative steps, may include two (2) or more rules that fall within a threshold amount with respect to the highest calculated accuracy, wherein calculated accuracy is defined as the ratio of transactions for which a rule is accurate versus a number of transactions for which the rule is "true." For example, if the highest calculated accuracy for a particular rule was ninety-nine percent (99%), the rule prioritization model 800 may be configured to remove all rules that are within a threshold amount of ninety-nine percent (99%), such as one-tenth of a percent (0.1%) of the highest calculated accuracy. Thus, the rule prioritization model 800 may remove all rules that are determined to have an accuracy between and including ninety-nine percent (99%) and ninety-eight and nine tenths of a percent (98.9%). It is contemplated that the threshold amount may be any amount that enables the rule prioritization model 800 to function as described herein.

Furthermore, it is noted that as a rule is identified for removal from the potential rule list and added to the ordered rule list, the rule prioritization model 800 also identifies each of the associated super rules and/or subrules associated with the identified rule. The rule identified for removal and its associated super rules/subrules are removed from the potential rule list and added to the ordered rule list in the order defined by the super rule/subrule prioritization operation described above.

The rule prioritization model 800 then generates a priority rules list, such as the final rules list 702 (or ordered rule list), that prioritizes the rules 424 from highest to lowest priority, starting with the prior-assigned priority rules and then appending the rules contained in the ordered rule list.

Additional Considerations

All terms used herein are to be broadly interpreted unless otherwise stated. For example, the term "payment card" and the like may unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other entity that can generate transactions with a cardholder account through a payment card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A computing system comprising:
a database including a plurality of predefined rules and labeled transaction data, each predefined rule including one or more conditions and being associated with an assigned category and keyword, the labeled transaction data including a plurality of individual labeled transactions, each labeled transaction being associated with an assigned category;
one or more processors; and
a memory storing computer-executable instructions thereon, that when executed by the one or more processors, cause the one or more processors to perform operations comprising:
receiving the plurality of predefined rules from the database;
receiving the labeled transaction data from the database;
creating a potential rule list on the database;
storing the plurality of predefined rules in the potential rule list on the database;
preprocessing the keywords associated with the plurality of predefined rules into a trie data structure;
executing, using the trie data structure, an Aho-Corasick multi-pattern substring search across description and memo data fields of the labeled transaction data in a single linear pass;
populating, on the database, a rule-to-transaction lookup table and a transaction-to-rule lookup table with links between each predefined rule and each labeled transaction whose keyword is detected;
creating an ordered rule list on the database;
retrieving, for each respective labeled transaction, from the rule-to-transaction lookup table only the predefined rules linked to the respective labeled transaction;
applying the retrieved predefined rules to the respective labeled transaction;
identifying each labeled transaction for which each predefined rule is true, wherein the predefined rule is true when all one or more conditions of the predefined rule are true for the respective labeled transaction;

updating the rule-to-transaction lookup table and the transaction-to-rule lookup table, for each labeled transaction for which a predefined rule is true, by linking the labeled transaction to the predefined rule; and
generating a priority-ordered list of the plurality of predefined rules in an iterative manner until all predefined rules have been removed from the potential rule list, comprising, in each iteration round:
for each predefined rule in the potential rule list, calculating an accuracy based on all labeled transactions for which the rule is true;
appending the highest accuracy predefined rules to the ordered rule list;
removing the predefined rules appended to the ordered rule list from the potential rule list; and
for each labeled transaction in the rule-to-transaction lookup table that corresponds to the predefined rules moved to the ordered rule list, removing the respective labeled transactions from all entries in the rule-to-transaction lookup table.

2. The computing system in accordance with claim 1, wherein the operation of generating the priority-ordered list of the plurality of predefined rules in an iterative manner further comprises the steps of:
identifying each other predefined rule associated with the respective labeled transactions removed from the entries in the rule-to-transaction lookup table using the transaction-to-rule lookup table; and
removing the respective labeled transactions from all the other predefined rule associations in the rule-to-transaction lookup table.

3. The computing system in accordance with claim 2, the computer-executable instructions causing the one or more processors to perform an operation of performing a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule,
wherein the operation of generating the priority-ordered list of the plurality of predefined rules in an iterative manner further comprises the steps of:
for each predefined rule appended to the ordered rule list, identifying each of the associated super rules and subrules associated with the respective predefined rule; and
adding the identified super rules and subrules to the ordered rule list in an order defined by the super rule/subrule prioritization operation.

4. The computing system in accordance with claim 1, the computer-executable instructions causing the one or more processors to perform an operation of performing a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule, wherein the operation of generating the priority-ordered list of the plurality of predefined rules in an iterative manner further comprises the steps of:

for each predefined rule appended to the ordered rule list, identifying each of the associated super rules and subrules associated with the respective predefined rule; and adding the identified super rules and subrules to the ordered rule list in an order defined by the super rule/subrule prioritization operation.

5. The computing system in accordance with claim 1, wherein a predefined rule is defined as accurate when the assigned category of the predefined rule matches the assigned category of a respective labeled transaction for which the rule is true.

6. The computing system in accordance with claim 1, wherein the highest accuracy predefined rules include two or more of the plurality of predefined rules that fall within a threshold amount with respect to the highest calculated accuracy.

7. The computing system in accordance with claim 6, wherein the operation of generating the priority-ordered list of the plurality of predefined rules comprises appending the ordered rule list to a list of prior-assigned priority rules.

8. A method for prioritizing a plurality of rules for an expert system, said method comprising:

receiving a plurality of predefined rules from a database, each predefined rule including one or more conditions and being associated with an assigned category and a keyword;

receiving labeled transaction data from the database, the labeled transaction data including a plurality of individual labeled transactions, each labeled transaction being associated with an assigned category;

creating a potential rule list on the database;

storing the plurality of predefined rules in the potential rule list on the database;

preprocessing the keywords associated with the plurality of predefined rules into a trie data structure;

executing, using the trie data structure, an Aho-Corasick multi-pattern substring search across description and memo data fields of the labeled transaction data in a single linear pass;

populating, on the database, a rule-to-transaction lookup table and a transaction-to-rule lookup table with links between each predefined rule and each labeled transaction whose keyword is detected;

creating an ordered rule list on the database;

retrieving, for each respective labeled transaction, from the rule-to-transaction lookup table only the predefined rules linked to the respective labeled transaction;

applying the retrieved predefined rules to the respective labeled transaction;

identifying each labeled transaction for which each predefined rule is true, wherein the predefined rule is true when all one or more conditions of the predefined rule are true for the respective labeled transaction;

updating the rule-to-transaction lookup table and the transaction-to-rule lookup table, for each labeled transaction for which a predefined rule is true, by linking the labeled transaction to the predefined rule; and generating a priority-ordered list of the plurality of predefined rules in an iterative manner until all predefined rules have been removed from the potential rule list, comprising, in each iteration round:

for each predefined rule in the potential rule list, calculating an accuracy based on all labeled transactions for which the rule is true;

appending the highest accuracy predefined rules to the ordered rule list;

removing the predefined rules appended to the ordered rule list from the potential rule list; and for each labeled transaction in the rule-to-transaction lookup table that corresponds to the predefined rules moved to the ordered rule list, removing the respective labeled transactions from all entries in the rule-to-transaction lookup table.

9. The method in accordance with claim 8, wherein the operation of generating the priority-ordered list of the plurality of predefined rules in an iterative manner further comprises the steps of:

identifying each other predefined rule associated with the respective labeled transactions removed from the entries in the rule-to-transaction lookup table using the transaction-to-rule lookup table; and removing the respective labeled transactions from all the other predefined rule associations in the rule-to-transaction lookup table.

10. The method in accordance with claim 9, the method further comprising performing a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule, wherein the operation of generating the priority-ordered list of the plurality of predefined rules in an iterative manner further comprises the steps of:

for each predefined rule appended to the ordered rule list, identifying each of the associated super rules and subrules associated with the respective predefined rule; and adding the identified super rules and subrules to the ordered rule list in an order defined by the super rule/subrule prioritization operation.

11. The method in accordance with claim 8, the computer-executable instructions causing the one or more processors to perform an operation of performing a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule, wherein the operation of generating the priority-ordered list of the plurality of predefined rules in an iterative manner further comprises the steps of:

for each predefined rule appended to the ordered rule list, identifying each of the associated super rules and subrules associated with the respective predefined rule; and adding the identified super rules and subrules to the ordered rule list in an order defined by the super rule/subrule prioritization operation.

12. The method in accordance with claim 8,
wherein a predefined rule is defined as accurate when the assigned category of the predefined rule matches the assigned category of a respective labeled transaction for which the rule is true.

13. The method in accordance with claim 8,
wherein the highest accuracy predefined rules include two or more of the plurality of predefined rules that fall within a threshold amount with respect to the highest calculated accuracy.

14. The method in accordance with claim 13,
wherein the operation of generating the priority-ordered list of the plurality of predefined rules comprises appending the ordered rule list to a list of prior-assigned priority rules.

15. A non-transitory computer-readable storage media having computer-executable instructions stored thereon, wherein when executed by one or more processors the computer-executable instructions cause the one or more processors to:
    receive a plurality of predefined rules from a database, each predefined rule including one or more conditions and being associated with an assigned category and a keyword;
    receive labeled transaction data from the database, the labeled transaction data including a plurality of individual labeled transactions, each labeled transaction being associated with an assigned category;
    create a potential rule list on the database;
    store the plurality of predefined rules in the potential rule list on the database;
    preprocess the keywords associated with the plurality of predefined rules into a trie data structure;
    execute, using the trie data structure, an Aho-Corasick multi-pattern substring search across description and memo data fields of the labeled transaction data in a single linear pass;
    populate, on the database, a rule-to-transaction lookup table and a transaction-to-rule lookup table with links between each predefined rule and each labeled transaction whose keyword is detected;
    create an ordered rule list on the database;
    retrieve, for each respective labeled transaction, from the rule-to-transaction lookup table only the predefined rules linked to the respective labeled transaction;
    apply the retrieved predefined rules to the respective labeled transaction;
    identify each labeled transaction for which each predefined rule is true, wherein the predefined rule is true when all one or more conditions of the predefined rule are true for the respective labeled transaction;
    update the rule-to-transaction lookup table and the transaction-to-rule lookup table, for each labeled transaction for which a predefined rule is true, by linking the labeled transaction to the predefined rule; and
    generate a priority-ordered list of the plurality of predefined rules in an iterative manner until all predefined rules have been removed from the potential rule list, comprising, in each iteration round:
        for each predefined rule in the potential rule list, calculate an accuracy based on all labeled transactions for which the rule is true;
        append the highest accuracy predefined rules to the ordered rule list;
        remove the predefined rules appended to the ordered rule list from the potential rule list; and for each labeled transaction in the rule-to-transaction lookup table that corresponds to the predefined rules moved to the ordered rule list, remove the respective labeled transactions from all entries in the rule-to-transaction lookup table.

16. The non-transitory computer-readable storage media of claim 15,
    the computer-executable instructions to generate the priority-ordered list of the plurality of predefined rules in an iterative manner further cause the one or more processors to:
        identify each other predefined rule associated with the respective labeled transactions removed from the entries in the rule-to-transaction lookup table using the transaction-to-rule lookup table; and
        remove the respective labeled transactions from all the other predefined rule associations in the rule-to-transaction lookup table.

17. The non-transitory computer-readable storage media of claim 16,
    when executed by the one or more processors, the computer-executable instructions further cause the one or more processors to perform a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule,
    the computer-executable instructions to generate the priority-ordered list of the plurality of predefined rules in an iterative manner further cause the one or more processors to:
        for each predefined rule appended to the ordered rule list, identify each of the associated super rules and subrules associated with the respective predefined rule; and
        add the identified super rules and subrules to the ordered rule list in an order defined by the super rule/subrule prioritization operation.

18. The non-transitory computer-readable storage media of claim 15,
    when executed by the one or more processors, the computer-executable instructions further cause the one or more processors to perform a super rule/subrule prioritization operation on the plurality of predefined rules, including prioritizing one or more super rules over one or more associated subrules, wherein a predefined rule is defined as a subrule when the associated keyword is a substring of a keyword associated with another predefined rule, and wherein a predefined rule is defined as a super rule when the associated keyword includes a keyword of another predefined rule,
    the computer-executable instructions to generate the priority-ordered list of the plurality of predefined rules in an iterative manner further cause the one or more processors to:
        for each predefined rule appended to the ordered rule list, identify each of the associated super rules and subrules associated with the respective predefined rule; and
        add the identified super rules and subrules to the ordered rule list in an order defined by the super rule/subrule prioritization operation.

19. The non-transitory computer-readable storage media of claim 15, wherein the highest accuracy predefined rules include two or more of the plurality of predefined rules that fall within a threshold amount with respect to the highest calculated accuracy.

20. The non-transitory computer-readable storage media of claim 19, the computer-executable instructions to generate the priority-ordered list of the plurality of predefined rules further cause the one or more processors to append the ordered rule list to a list of prior-assigned priority rules.

* * * * *